(12) United States Patent
Oomi

(10) Patent No.: US 10,392,837 B2
(45) Date of Patent: Aug. 27, 2019

(54) ONBOARD DEVICE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Norichika Oomi, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/519,353

(22) PCT Filed: Oct. 23, 2015

(86) PCT No.: PCT/JP2015/079992
§ 371 (c)(1),
(2) Date: Apr. 14, 2017

(87) PCT Pub. No.: WO2016/068045
PCT Pub. Date: May 6, 2016

(65) Prior Publication Data
US 2017/0247918 A1    Aug. 31, 2017

(30) Foreign Application Priority Data
Oct. 29, 2014 (JP) .................................. 2014-220492

(51) Int. Cl.
*E05B 81/58*    (2014.01)
*B60R 25/01*    (2013.01)
(Continued)

(52) U.S. Cl.
CPC .............. *E05B 81/58* (2013.01); *B60R 25/01* (2013.01); *B60R 25/24* (2013.01); *E05B 77/48* (2013.01);
(Continued)

(58) Field of Classification Search
CPC .......... E05B 81/58; E05B 81/78; E05B 77/48; E05B 81/70; E05F 15/77; E05F 15/73; B60R 25/01; B60R 25/24
See application file for complete search history.

(56) References Cited

U.S. PATENT DOCUMENTS

| | | | |
|---|---|---|---|
| 9,014,920 B1 * | 4/2015 | Torres | G08B 21/0202 701/45 |
| 2002/0025823 A1 * | 2/2002 | Hara | B60R 25/24 455/456.5 |

(Continued)

FOREIGN PATENT DOCUMENTS

| | | |
|---|---|---|
| JP | 56-067145 | 6/1981 |
| JP | 62-014069 | 1/1987 |

(Continued)

OTHER PUBLICATIONS

Search Report issued in International Bureau of WIPO Patent Application No. PCT/JP2015/079992, dated Dec. 22, 2015.

*Primary Examiner* — Rodney A Butler
(74) *Attorney, Agent, or Firm* — Greenblum & Bernstein, P.L.C.

(57) ABSTRACT

The present invention provides an onboard device capable of further enhancing safety of an occupant aboard a vehicle. The onboard device controlling locking of a vehicle door includes an occupant detector detecting the occupant inside a vehicle, a shut door determiner determining whether the vehicle door is closed, and a locking controller locking the vehicle door when the shut door determiner determines that the vehicle door is closed and the occupant detector detects (Continued)

the occupant. By locking the vehicle door, a third party can be prevented from entering the vehicle through the vehicle door, for example, and the safety of the occupant aboard the vehicle can be further enhanced.

6 Claims, 5 Drawing Sheets

(51) Int. Cl.
*B60R 25/24* (2013.01)
*E05B 77/48* (2014.01)
*E05B 81/70* (2014.01)
*E05F 15/77* (2015.01)
*E05F 15/73* (2015.01)
*E05B 81/78* (2014.01)

(52) U.S. Cl.
CPC .............. *E05B 81/70* (2013.01); *E05B 81/78* (2013.01); *E05F 15/73* (2015.01); *E05F 15/77* (2015.01)

(56) References Cited

U.S. PATENT DOCUMENTS

| | | | |
|---|---|---|---|
| 2002/0043024 A1 | 4/2002 | Tanaka | |
| 2007/0216517 A1* | 9/2007 | Kurpinski | B60R 25/2036 340/5.72 |
| 2013/0197712 A1* | 8/2013 | Matsuura | B60R 25/24 701/1 |
| 2013/0241694 A1* | 9/2013 | Sharma | G08C 17/02 340/5.64 |
| 2014/0229568 A1* | 8/2014 | Raffa | H04L 67/12 709/217 |
| 2014/0285319 A1* | 9/2014 | Khan | G07C 9/00309 340/5.61 |
| 2015/0276415 A1* | 10/2015 | Shrinath | G01C 21/36 701/1 |

FOREIGN PATENT DOCUMENTS

| | | |
|---|---|---|
| JP | 05-314137 | 11/1993 |
| JP | 2002-070393 | 3/2002 |
| JP | 2005-273281 | 10/2005 |
| JP | 2005-273329 | 10/2005 |

* cited by examiner

ONBOARD DEVICE

FIELD OF THE INVENTION

The present invention relates to an onboard device controlling locking of a vehicle door.

BACKGROUND OF THE INVENTION

Conventionally, onboard devices locking and unlocking a vehicle door based on wireless communication with a portable device are known. For example, when a user possessing the portable device grips a door handle, when an operator provided in a vicinity of the door handle is operated, or the like, the onboard device performs wireless communication with the portable device and unlocks/locks the vehicle door.

According to Patent Literature 1, a method is disclosed in which, when a first switch provided to a particular vehicle door is operated, an authentication is performed via wireless communication between the portable device and the onboard device, and when the authentication is performed properly, the particular vehicle door is unlocked. In addition, according to a method described in Patent Literature 1, in a state where the particular vehicle door is unlocked by the first switch operation, all vehicle doors are unlocked when a second switch provided to the particular vehicle door is operated. Therefore, in the method described in Patent Literature 1, all the vehicle doors are not unlocked unless the second switch is operated after unlocking the particular vehicle door. Accordingly, the method can prevent a third party from entering the vehicle due to unintentional unlocking of the vehicle doors and safety of an occupant can be enhanced when aboard the vehicle.

In addition, an onboard device is becoming popular which locks the vehicle doors when the vehicle travels at or exceeds a specified speed. Such onboard devices can prevent the occupant in the vehicle from accidentally opening the vehicle door during travel and secure the safety of the occupant while the vehicle is in motion.

RELATED ART

Patent Literature

Patent Literature 1: Japanese Patent Laid-open Publication No. 2005-273329

SUMMARY OF THE INVENTION

Problems to Be Solved by the Invention

According to the method in Patent Literature 1 and the onboard devices mentioned above, the safety of the occupant when boarding the vehicle and after the vehicle is in motion can be enhanced. However, the safety of the occupant after boarding the vehicle until the vehicle is in motion is not considered.

The present application provides an onboard device capable of further enhancing safety of an occupant aboard a vehicle.

Means for Solving the Problems

In an onboard device according to one aspect of the present invention, the onboard device controlling locking of a vehicle door includes an occupant detector detecting an occupant inside a vehicle, a shut door determiner determining whether the vehicle door is closed, and a locking controller locking the vehicle door when the shut door determiner determines that the vehicle door is closed and the occupant detector detects the occupant.

Further, the present application can be achieved not only as an onboard device which includes such characteristic processors, but can also be achieved as a vehicle locking method performing the aforesaid characteristic processes in steps, as a program executing the aforesaid steps on a computer, and the like. In addition, the present application can be achieved as a semiconductor integrated circuit accomplishing all or a portion of an onboard device, or as some other system that includes a locking system, onboard device, and portable device.

Effect of the Invention

According to the above description, safety of an occupant aboard a vehicle can be further enhanced.

MODE FOR CARRYING OUT THE INVENTION

Figure 1:
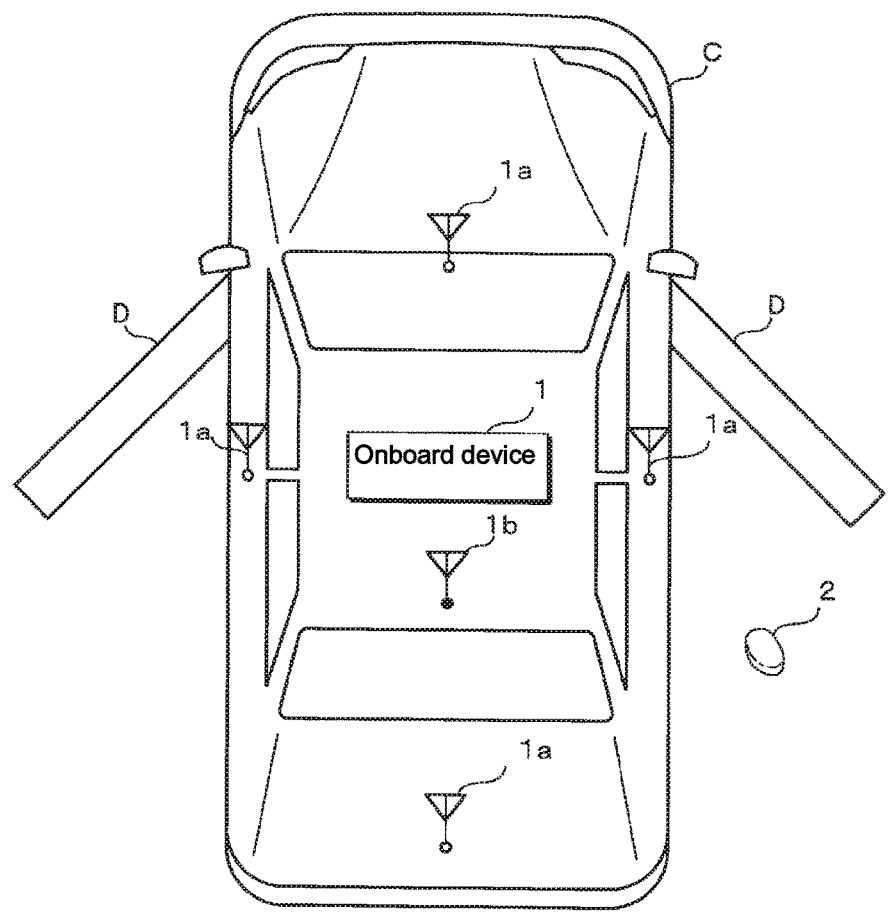
FIG. 1 is a schematic view illustrating an exemplary configuration of a locking system according to Embodiment 1.

Description of Embodiments of the Present Invention

First, a description is provided of several embodiments of the present invention. Also, at least a portion of the embodiments listed below may be used in combination as desired.

(1) In an onboard device according to one aspect of the present invention, the onboard device controlling locking of a vehicle door includes an occupant detector detecting an occupant inside a vehicle, a shut door determiner determining whether the vehicle door is closed, and a locking controller locking the vehicle door when the shut door determiner determines that the vehicle door is closed and the occupant detector detects the occupant.

In the present application, the occupant detector detects the occupant inside the vehicle. The shut door determiner determines whether the vehicle door is closed. The locking controller locks the vehicle door automatically when the shut door determiner determines that the vehicle door is closed and the occupant detector detects the occupant. Accordingly, the onboard device locks the vehicle door after detecting the occupant being inside the vehicle via the occupant detector when the vehicle door is closed. Therefore, by automatically locking the vehicle door, for example, a third party can be prevented from entering the vehicle through the vehicle door left unlocked after boarding the vehicle, and the safety of the occupant aboard the vehicle can further be enhanced.

(2) A configuration is preferred in which an open door determiner and a clocking portion are further provided, the open door determiner determining whether the vehicle door is open and the clocking portion measuring time after the open door determiner determines that the vehicle door is open and until the shut door determiner determines that the vehicle door is closed, and the locking controller does not lock the vehicle door when the time measured by the clocking portion is at least a predetermined time.

In the present application, the open door determiner determines whether the vehicle door is open. The clocking portion measures time after the open door determiner determines that the vehicle door is open until the shut door determiner determines that the vehicle door is closed. The locking controller does not lock the vehicle door when the time measured by the clocking portion is at least the predetermined time. Accordingly, when the time spent in opening/closing the vehicle door when the occupant boards the vehicle is at least the predetermined time, the onboard device does not lock the vehicle door, inferring that there is no urgency to secure the safety of the occupant. Therefore, the onboard device can lock the vehicle door only when the urgency exists to secure the safety of the occupant when the occupant is aboard the vehicle.

(3) A configuration is preferred in which a wireless communicator and a location determiner are further provided, the wireless communicator performing wireless communication with the portable device and the location determiner determining whether the portable device exists inside the vehicle based on wireless communication between the wireless communicator and the portable device, and the locking controller locks the vehicle door after the location determiner determines that the portable device exists inside the vehicle.

In the present application, the wireless communicator performs wireless communication with the portable device. The location determiner determines whether the portable device exists inside the vehicle based on wireless communication between the wireless communicator and the portable device. In addition, the locking controller locks the vehicle door after the location determiner determines that the portable device exists inside the vehicle. Therefore, the onboard device can avoid a situation where the vehicle door is accidentally locked before the vehicle user boards the vehicle because the onboard device can detect that the occupant is the vehicle user.

(4) A configuration is preferred in which the occupant detector detects sitting of the occupant on a seat corresponding to the vehicle door.

In the present application, the occupant inside the vehicle can be detected by detecting the sitting of the occupant on the seat corresponding to the vehicle door.

(5) In the onboard device according to the present invention, the vehicle door is provided for getting on/off from a driver seat or a passenger seat.

In the present application, the vehicle door is provided for getting on/off from the driver seat or the passenger seat. Therefore, for example, in a case where only the vehicle door provided for getting on/off from the driver seat or the passenger seat can be unlocked, the safety of the occupant boarding the vehicle from the vehicle door can be enhanced.

(6) A configuration is preferred in which a plurality of vehicle doors are provided to the vehicle and the locking controller locks all the vehicle doors.

In the present application, a plurality of vehicle doors are provided to the vehicle. The locking controller locks all the vehicle doors provided to the vehicle. Therefore, even when the vehicle doors other than the vehicle door through which the user boards are unlocked, a third party is prevented from entering the vehicle through the other vehicle doors for example and the safety of the occupant can be further enhanced.

DETAILED DESCRIPTION OF EMBODIMENTS OF THE PRESENT INVENTION

Hereafter, specific examples of an onboard device according to embodiments of the present invention are described with reference to the drawings. Further, in each of the embodiments below, the description is given for a locking system locking the vehicle door when the onboard device according to the embodiments of the present invention performs wireless communication with a corresponding portable device. In addition, the present invention is not limited to these examples and is indicated by the scope of the claims. Construals equivalent to the scope of the claims and all modifications within the scope of the claims are included.

Embodiment 1

FIG. 1 is a schematic view illustrating an exemplary configuration of a locking system according to Embodiment 1. The locking system according to Embodiment 1 includes an onboard device 1 and one or a plurality of portable devices 2. The onboard device 1 transmits and receives various signals using a plurality of LF transmission antennas 1a and RF reception antennas 1b provided to a vehicle C. The portable device 2 transmits and receives the various signals with the onboard device 1. Via transmission and reception of the signals with the portable device 2, the onboard device 1 controls locking of a plurality of vehicle doors D provided to the vehicle C. In addition, the onboard device 1 according to Embodiment 1 controls locking of the vehicle door D on the driver seat side based on an opening/closing operation of the vehicle door D on the driver seat side, existence of the occupant inside the vehicle C, and location of the portable device 2. Further, FIG. 1 shows the plurality of vehicle doors D provided to a front portion of the vehicle C (in other words, each of the driver seat side and passenger seat side of the vehicle C), however this is an example and the vehicle doors D may be provided to other portions of the vehicle C such as for getting on/off a rear seat of the vehicle C and the like. In addition, the vehicle door D on the driver seat side may be called a driver seat door D below. For example, the plurality of LF transmission antennas 1a are provided at four locations (front portion of the vehicle C, a back door, a pillar on the driver side, and a pillar on the passenger side) and each LF transmission antenna 1a transmits signals using radio waves in a LF (Low Frequency) band. Further, the LF band is an example of a radio wave band frequency transmitting the signal, and the present invention is not necessarily limited to this.

Figure 2:
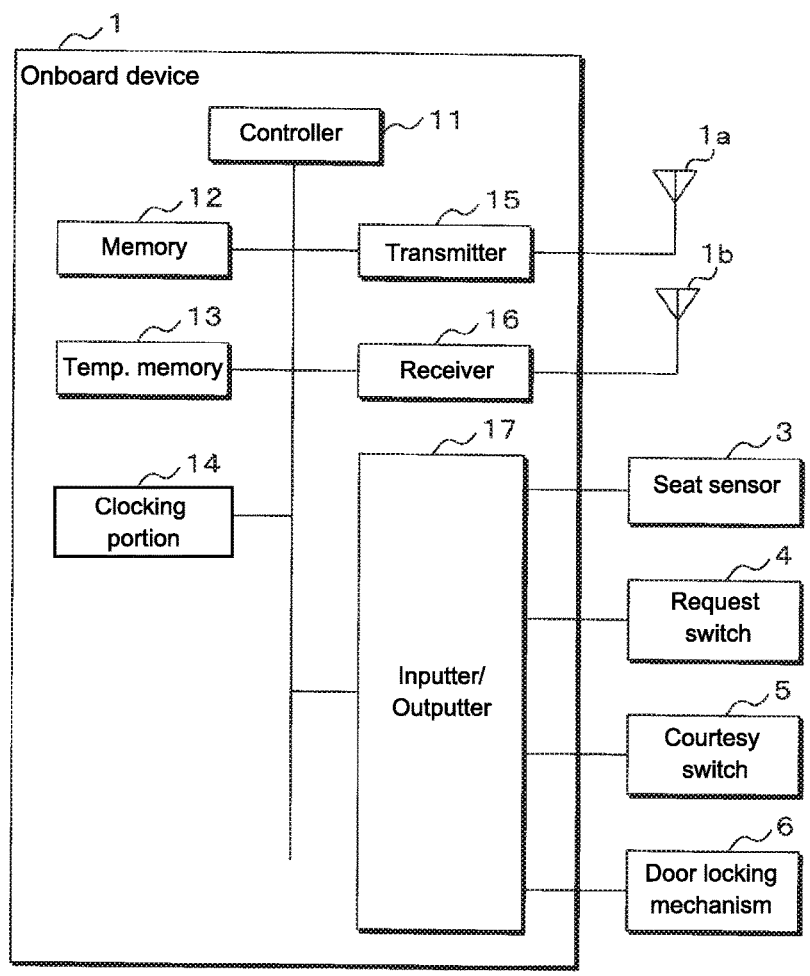
FIG. 2 is a block diagram illustrating a configuration of an onboard device.

FIG. 2 is a block diagram illustrating a configuration of the onboard device 1. The onboard device 1 includes a controller 11, memory 12, temporary memory 13, clocking portion 14, transmitter 15, receiver 16, and inputter/outputter 17, and each portion is connected through a bus. For example, the controller 11 includes one or a plurality of CPUs (Central Processing Units), a multicore CPU, and the like. The controller 11 retrieves a control program (described later) stored in the memory 12 and controls each portion.

The memory 12 is a non-volatile memory such as an EEPROM (Electrically Erasable and Programmable ROM), flash memory, HDD (Hard Disk Drive) and the like. The memory 12 stores the control program. The control program is a computer program written with a process for when the controller 11 performs communication with the portable device 2 and a process for when each of the portions is controlled.

The temporary memory 13 is a memory such as a SRAM (Static Ram), DRAM (Dynamic RAM), and the like. The temporary memory 13 stores various data temporarily, the data being generated by the controller 11 performing the processes in the control program.

The clocking portion 14 is configured by a timer, real time clock, and the like, for example, and starts timing according to control from the controller 11 and provides a timing result to the controller 11.

The transmitter 15 is connected to the plurality of LF transmission antennas 1a and transmits signals to determine a location of the portable device 2 according to control from the controller 11. The signal to determine the location is a detection signal causing the portable device 2 to detect reception signal intensity, for example. The receiver 16 is connected to the RF reception antenna 1b, receives the various signals such as a response signal transmitted using radio waves of a UHF (Ultra High Frequency) band from the portable device 2, and outputs the received signal to the controller 11. Since communication via the radio waves in the UHF band is possible over a broad area, placement of the RF reception antenna 1b in the vehicle C is not particularly limited. The transmitter 15 and the receiver 16 in Embodiment 1 correspond to the wireless communicator. Further, with a configuration where the onboard device 1 and the portable device 2 can perform wireless communication, a device that is separate from the onboard device 1 may be provided having a wireless communication function. In such a case, the device having the wireless communication function corresponds to the wireless communicator.

A seat sensor 3, a request switch 4, a courtesy switch 5, and a door locking mechanism 6 are connected to the inputter/outputter 17.

For example, the seat sensor 3 includes a switch using a piezoelectric element or the like, provided to an inside of the driver seat. The seat sensor 3 outputs a signal to the controller 11 indicating a detection of sitting when the switch is pressed by sitting on the driver seat. Depending on whether the signal from the seat sensor 3 is input, the controller 11 determines whether someone is sitting in the driver seat. The seat sensor 3 corresponds to the occupant detector.

The request switch 4 is provided to an exterior surface of each vehicle door D. For example, the request switch 4 is configured by a depressing type switch locking/unlocking the door provided, a contact sensor detecting the user's touch on a door handle, and the like. When operated by the user, the request switch 4 outputs to the controller 11 a signal indicating that the request switch 4 has been operated. The controller 11, for example, controls locking/unlocking of the vehicle door D in response to the signal input by the request switch 4 and a state of the door locking mechanism 6. Further, in each request switch 4, the configuration locking the door provided and the configuration unlocking the door may be separate.

The courtesy switch 5 is provided to a location on a vehicle body of the vehicle C covered by an internal surface of each vehicle door D, and detects opening/closing of the corresponding vehicle door D. For example, the courtesy switch 5 is turned "ON" when the provided vehicle door D is opened and turned "OFF" when the vehicle door D is closed. The controller 11 detects whether the vehicle door D is opened or closed by detecting whether the courtesy switch 5 is on or off.

The door locking mechanism 6 is provided to a periphery of each vehicle door D of the vehicle C. The door locking mechanism 6 includes a mechanical mechanism locking/unlocking the door, an actuator electrically operating the mechanical mechanism, and the like. The door locking mechanism 6 locks/unlocks the vehicle door D by operating the mechanical mechanism via operation of the actuator according to a command by the controller 11.

Figure 3:
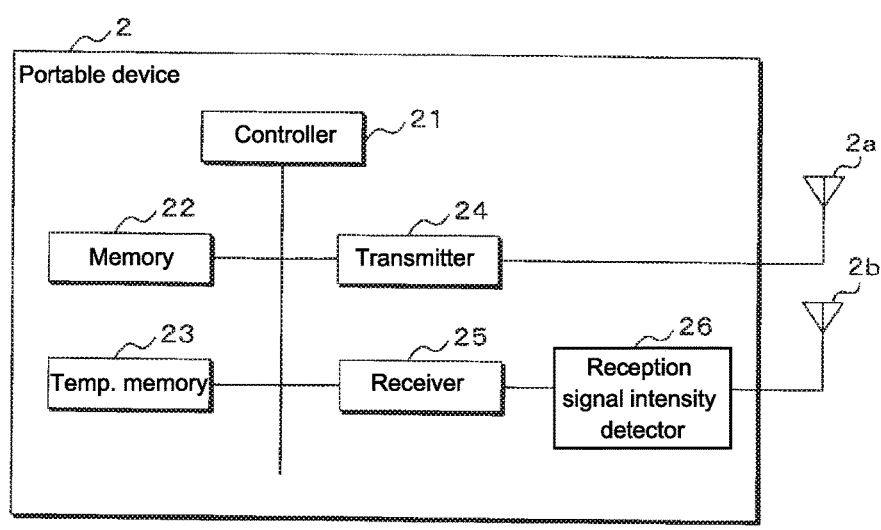
FIG. 3 is a block diagram illustrating a configuration of a portable device.

FIG. 3 is a block diagram illustrating a configuration of the portable device 2. The portable device 2 includes a controller 21, a memory 22, a temporary memory 23, a transmitter 24, and a receiver 25, and each portion is connected through a bus. For example, the controller 21 includes one or a plurality of CPUs, a multicore CPU, and the like. The controller 21 retrieves a control program (described later) stored in the memory 22 and controls each portion.

The memory 22 is a non-volatile memory such as EEPROM, flash memory, and the like. The memory 22 stores the control program. The control program is a computer program written with a process for when the controller 21 communicates with the onboard device 1 and a process for when each of the portions is controlled.

The temporary memory 23 is a memory such as SRAM (Static Ram), DRAM, and the like. The temporary memory 23 stores various data temporarily, the data being generated by the controller 21 performing the processes in the control program.

The transmitter 24 is connected to an RF transmission antenna 2a and, according to the control by the controller 21, transmits the response signal corresponding to the detection signal transmitted from the onboard device 1. The transmitter 24 transmits a response signal using the radio waves of the UHF body. Further, the UHF band is an example of the radio wave band frequency transmitting the signal and the present invention is not necessarily limited to this.

The receiver 25 is connected to an LF reception antenna 2b via a reception signal intensity detector 26, receives the various signals transmitted from the onboard device 1 using the radio waves of the LF band, and outputs to the controller 21. For example, the LF reception antenna 2b is a triaxial antenna and is capable of detecting the reception signal intensity regardless of a direction or an orientation of the portable device 2 with respect to the vehicle C. The reception signal intensity detector 26 is a circuit detecting the reception signal intensity of the detection signal received by the LF reception antenna 2b and outputting the detected reception signal intensity to the controller 21.

In the locking system configured as described above, the onboard device 1 locks/unlocks the vehicle door D using the signal transmitted from the portable device 2. Specifically, when a switch or the like (not shown in the drawings) of the portable device 2 is operated, the signal including the locking/unlocking request is transmitted from the transmitter 24. When the signal is received by the receiver 16 of the onboard device 1, the controller 11 gives the command to the door locking mechanism 6 and locks/unlocks the vehicle door D. In addition, the onboard device 1 performs wireless communication with the portable device 2 and locks/unlocks the vehicle door D when the user operates the request switch 4. Specifically, the onboard device 1 transmits the signal from the transmitter 15 when the request switch 4 is operated. The portable device 2 receives the signal with the receiver 25 and transmits the response signal to the signal with the transmitter 24. The onboard device 1 locks/unlocks the vehicle door D by receiving the response signal with the receiver 16 and outputting the command to the door locking mechanism 6 based on the response signal received by the controller 11.

In this example, the onboard device 1 according to Embodiment 1 is configured such that only the driver seat door D of the vehicle C can be unlocked. For example, the portable device 2 may be configured so as to be capable of transmitting the unlocking signal of the driver seat door D and the onboard device 1 which receives the unlocking signal may unlock only the driver seat door D. In addition, the onboard device 1 may unlock only the driver seat door D based on an operation mode of the request switch 4 provided to the exterior surface of the driver seat door D. For example, the operation mode may be operating the request switch 4 twice in a row and the like.

The onboard device 1 according to Embodiment 1 further locks the driver seat door D based on a specific action of the user boarding the vehicle C. The specific boarding action is, after the user performs the unlocking operation of only the driver seat door D, to open the driver seat door D, to board the vehicle C within a predetermined time, and then to close the driver seat door D. Hereafter, a procedural flow of the onboard device 1 after only the driver seat door D is unlocked by the user is illustrated.

Figure 4:
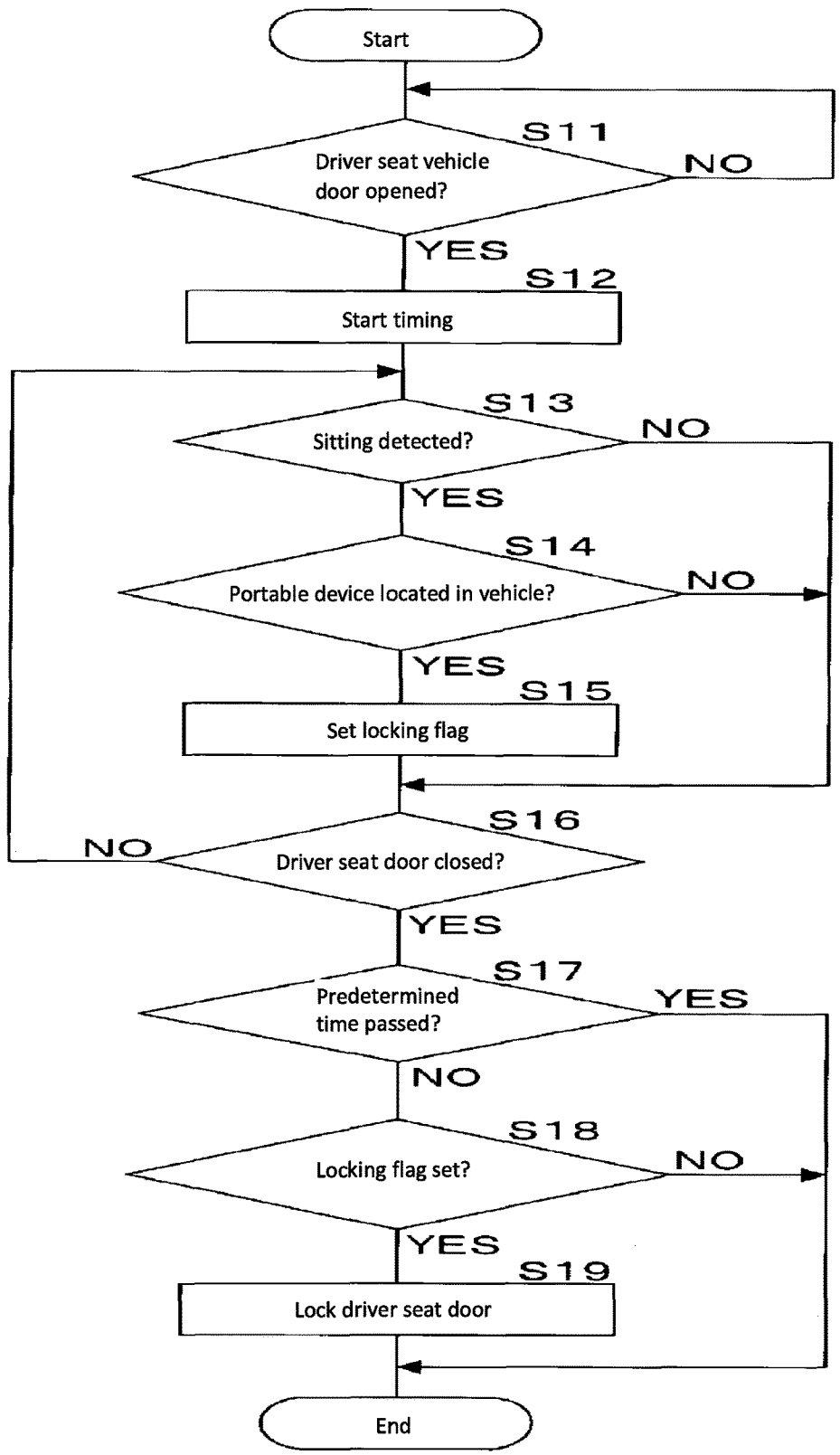
FIG. 4 is a flow chart illustrating a procedural flow of the onboard device when a user boards a vehicle from an unlocked driver side door.

FIG. 4 is a flow chart illustrating a procedural flow of the onboard device 1 when the user boards the vehicle C from the unlocked driver seat door D. The controller 11 of the onboard device 1 determines whether the driver seat door D is open (step S11). The controller 11, for example, determines whether a change from "OFF" to "ON" of the courtesy switch 5 provided to the driver seat door D is detected. In step S11, the controller 11 serves as the open door determiner by executing the control program. In a case where the controller 11 determines that the driver seat door D is not open (S11: NO), the controller 11 waits until the vehicle door D is open.

When the driver seat door D is determined to be open (S11: YES), the controller 11 gives a command to the clocking portion 14 and starts timing (step S12). Then, the controller 11 determines whether sitting on the driver seat is detected (step S13). For example, the controller 11 makes the determination based on whether the signal from the seat sensor 3 provided to the driver seat is input. When a determination is made that sitting on the driver seat is not detected (S13: NO), the controller 11 advances the process to step S16.

When a determination is made that sitting on the driver seat is detected (S13: YES), the controller 11 determines whether the portable device 2 exists inside the vehicle (step S14). For example, the controller 11 makes the determination by sequentially transmitting signals for detecting the reception signal intensity from each LF transmitter antenna 1a and by receiving the response signal transmitted from the portable device 2 which receives the signals. More specifically, the portable device 2 measures the reception signal intensity when the signal for detecting the reception signal intensity is received and includes the reception signal intensity in the response signal. The controller 11 of the onboard device 1 determines whether the portable device 2 exists inside the vehicle based on the reception signal intensity included in the response signal. Further, the onboard device 1 may determine whether the portable device 2 exists inside the vehicle via various known determination methods in which wireless communication with the portable device 2 is performed. The controller 11 serves as the location determiner by executing the control program in step S14. When a determination is made that the portable device 2 is not present inside the vehicle (S14: NO), the controller 11 advances the process to step S16.

When a determination is made that the portable device 2 is located inside the vehicle (S14: YES), the controller 11 sets a locking flag (step S15). For example, the controller 11 sets the locking flag by storing the locking flag in the temporary memory 13 temporarily. The locking flag is information that indicates whether the driver seat door D can be locked.

Next, the controller 11 determines whether the driver seat door D is closed (step S16). For example, the controller 11 determines whether the courtesy switch 5 provided to the driver seat door D changing from "ON" to "OFF" has been detected. In step S16, the controller 11 serves as the shut door determiner by executing the control program. When a determination is made that the driver seat door D is not closed (S16: NO), the controller 11 returns the process to step S13.

When a determination is made that the driver seat door D is closed (S16: YES), the controller 11 determines whether a predetermined time has passed since the timing began in step S12 (step S17). The predetermined time is an amount of time within a range of 5 to 10 seconds, for example. Further, the predetermined time being within the range of 5 to 10 seconds is only an example and any desired amount of time can be set as the predetermined time. When a determination is made that the predetermined time has passed (S17: YES), the controller 11 finishes the process without locking the driver seat door D.

When a determination is made that the predetermined time has not passed (S17: NO), the controller 11 determines whether the locking flag is set (step S18). For example, the controller 11 determines whether the temporary memory 13 stores information indicating the locking flag. When a determination is made that the locking flag is not set (S18: NO), the controller 11 ends the process.

When a determination is made that the locking flag is set (S18: YES), the controller 11 locks the driver seat door D (step S19) and ends the process. In step S19, the controller 11 serves as the locking controller by executing the control program.

With the configuration and the process noted above, when the driver seat door D is closed, the onboard device 1 locks the driver seat door D automatically after detecting that the occupant is inside the vehicle C with the seat sensor 3. Therefore, a third party can be prevented from entering through the vehicle door D which is left unlocked after boarding the vehicle C, for example, and the safety of the occupant aboard the vehicle can be further enhanced.

In addition, when a determination is made in step S17 in FIG. 4 that the time for opening/closing the driver seat door D is at least the predetermined time when the occupant boards the vehicle C, the onboard device 1 infers that there is no urgency to secure the safety of the occupant and does not lock the driver seat door D. Therefore, the onboard device 1 can lock the driver seat door D only when there is urgency to secure the safety of the occupant when the occupant boards the vehicle C. Further, even when the processes in steps S12 and S17 are not performed, the safety of the occupant when boarding the vehicle C can, of course, still be enhanced.

In addition, the onboard device 1 can detect that the occupant is the user of the vehicle C by the process in step S14 in FIG. 4, and therefore the onboard device 1 can avoid a situation where the vehicle door D is accidentally locked before the user of the vehicle C boards.

Further, in Embodiment 1, an example is described where the onboard device 1 can unlock only the driver seat door D, and the driver seat door D is locked when the user performs the specific boarding action described above when the driver seat door D has been unlocked. However, the object of locking/unlocking may be any vehicle door D other than the driver seat door D. For example, a configuration is also possible in which the onboard device 1 can unlock only the vehicle door D on the passenger side, and the vehicle door D on the passenger side is locked when the user performs the specific boarding action when the vehicle door D on the passenger side has been unlocked. Furthermore, in Embodiment 1, the onboard device 1 may be configured such that each of the vehicle doors D can be unlocked separately, and each door may be locked separately with respect to the specific boarding action performed with each of the vehicle doors D.

Embodiment 2

In Embodiment 1, an example is described where only the driver seat door D is locked with respect to the specific action of the user boarding to the vehicle C. However, in Embodiment 2, an example is described where all the vehicle doors D provided to the vehicle C are locked. Further, other configurations and operations except for the configurations and operations described below are similar to those of the above noted Embodiment 1, and therefore, a detailed description of similar configurations and a description of the operation effects are omitted for simplicity.

In Embodiment 1, a description is given that the onboard device 1 is configured so as to be capable of unlocking only the driver seat door D of the vehicle C, however in Embodiment 2, this is not required. In Embodiment 2, the onboard device 1 is configured such that all the vehicle doors D are unlocked by the user operating the portable device 2 or the request switch 4.

In a locking system of Embodiment 2 configured in this way, the onboard device 1 locks all the vehicle doors D based on the specific action of the user boarding the vehicle C. The specific boarding action in Embodiment 2 is for the user to perform the unlocking operation of the vehicle door D and then to open the desired vehicle door D, and to board the vehicle C within the predetermined time and close the appropriate driver seat door D. What follows is an illustration of a procedural flow of the onboard device 1 after the unlocking operation of the vehicle doors D is performed by the user.

Figure 5:
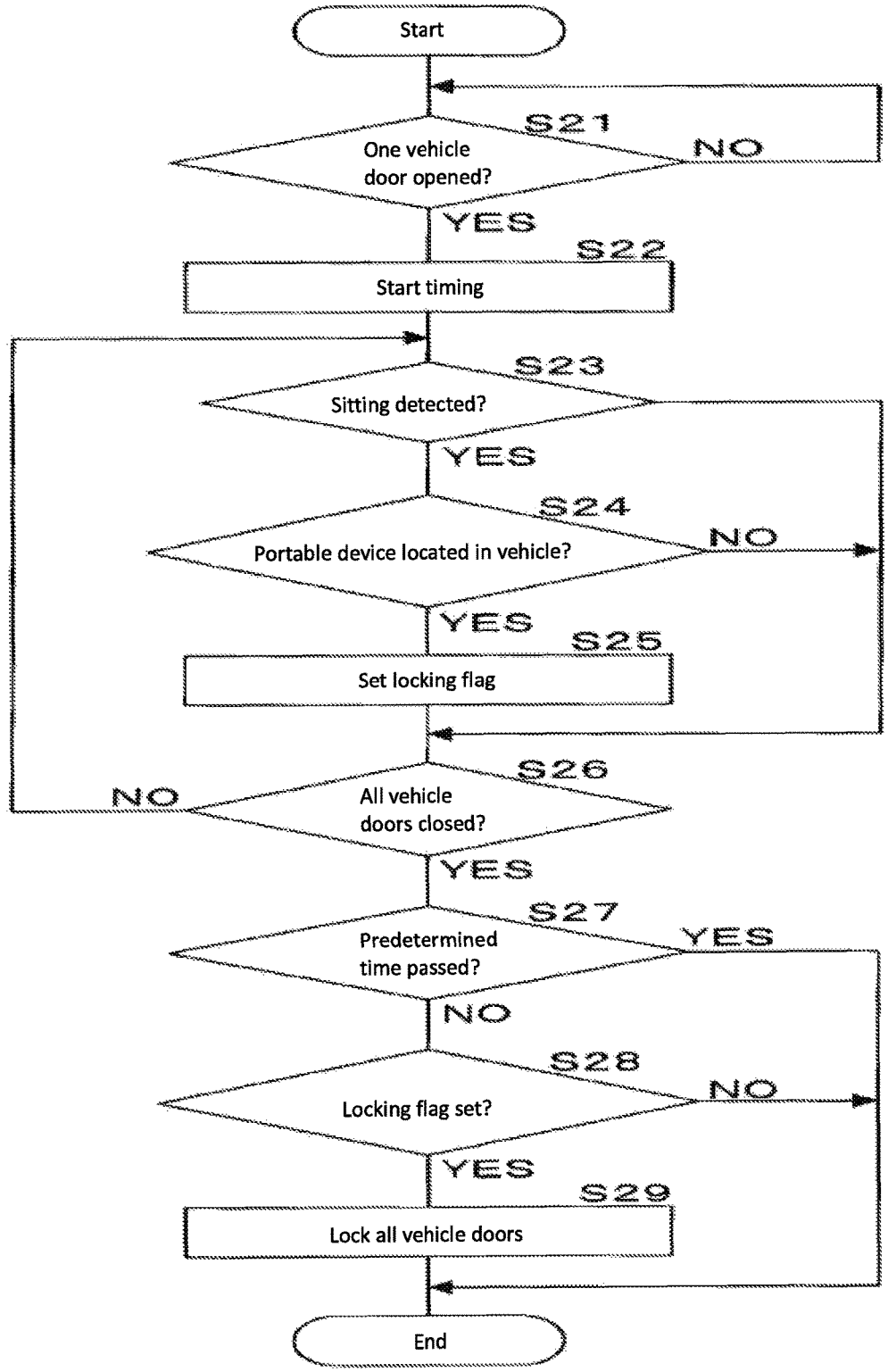
FIG. 5 is a flow chart illustrating a procedural flow of an onboard device when a user boards a vehicle from an unlocked vehicle door according to Embodiment 2.

FIG. 5 is a flow chart illustrating a procedural flow of the onboard device 1 when the user boards the vehicle C from the unlocked vehicle door D according to Embodiment 2. Further, the processes in steps S22 to S25, step S27, and step S28 in FIG. 5 are the same as the processes in steps S12 to S15, step S17, and step S18 in FIG. 4, and therefore the description thereof is omitted except for different process contents.

The controller 11 of the onboard device 1 determines whether the desired vehicle door D is opened after performing the unlocking operation of the vehicle door D (step S21). For example, the controller 11 makes a determination based on whether the courtesy switch 5 changing from the "OFF" state to the "ON" state is first detected after outputting the command related to unlocking the vehicle door D to the door locking mechanism 6. In step S11, the controller 11 serves as the open door determiner by executing the control program.

When a determination is made that none of the vehicle doors D is open (S21: NO), the controller 11 waits until detecting that any of the vehicle doors D is opened. On the other hand, when a determination is made that one of the vehicle doors D is open (S21: YES), the controller 11 advances to the process beginning at step S22. At this time, the controller 11 in step S23 detects sitting on the seat corresponding to the vehicle door D determined to be open in step S21.

After performing the process in step S25, the controller 11 determines whether all the vehicle doors D are closed (step S26). For example, the controller 11 makes the determination based on whether all the courtesy switches 5 are in the "OFF" state. In step S26, the controller 11 serves as the shut door determiner by executing the control program.

When a determination is made that not all of the vehicle doors D are closed, in other words, that any of the vehicle doors D is open (S26: NO), the controller 11 returns the process to step S23. On the other hand, when a determination is made that all the vehicle doors D are closed (S26: YES), the controller advances to the process beginning at step S27.

When a determination is made that the locking flag is set in the process of step S28 (S28: YES), the controller 11 locks all the vehicle doors D (step S29).

With the configuration and the processes noted above, even when a vehicle door D other than the vehicle door D through which the user boards is unlocked, the onboard device 1 can prevent a third party from entering through the other vehicle door D for example, and the safety of the occupant can be further enhanced.

In addition, in Embodiment 2, the onboard device 1 locks all the vehicle doors D when all the vehicle doors D are closed within the predetermined time after the desired vehicle door D is opened. Therefore, even when a plurality of occupants board the vehicle C through the respectively different vehicle doors D, the safety of each occupant can be enhanced.

Further, in Embodiments 1 and 2, the occupant in the vehicle C is detected by the seat sensor 3, however the occupant may be detected by some other configuration. For example, the occupant in the vehicle C may be detected by a motion sensor configured to use infrared light, an ultrasonic wave, and the like; an image capturer such as a camera; or the like.

In addition, in Embodiment 1, a description is given where the driver seat door D is locked by the onboard device 1 performing each process according to the procedural flow shown in FIGS. 4 and 5, however, the noted procedural flow is only an example. When sitting on the driver seat is detected, the portable device 2 is located inside the vehicle, and the driver seat door D or one of the vehicle doors D is opened and closed within the predetermined time, the onboard device 1 may lock the driver seat door D or all the vehicle doors D, inferring that the user performed the specific boarding action.

Further, in Embodiments 1 and 2, a description is given where the onboard device 1 determines whether the portable device 2 is located inside the vehicle, however this is not a requirement. For example, instead of the determination, in step S11 in FIG. 4 or step S21 in FIG. 5, the onboard device 1 may determine whether the driver seat door D or one of the vehicle doors D is opened within the predetermined time after the unlocking operation is performed.

The embodiments disclosed in this invention are exemplary in all respects, and therefore should be considered not to be restrictive. The scope of the present invention is not limited to the meanings noted above and may include all modifications with an equivalent meaning and scope to that provided by the scope of claims.

DESCRIPTION OF REFERENCE NUMERALS

1: Onboard device
1a: LF transmission antenna
1b: RF reception antenna
2: Portable device
2a: RF transmission antenna
2b: LF reception antenna
3: Seat sensor
4: Request switch
5: Courtesy switch
6: Door locking mechanism
11: Controller
12: Memory
13: Temporary memory
14: Clocking portion
15: Transmitter
16: Receiver
17: Inputter/Outputter
21: Controller
22: Memory
23: Temporary memory
24: Transmitter
25: Receiver
26: Reception signal intensity detector
C: Vehicle
D: Vehicle door

The invention claimed is:

1. An onboard device which controls locking of a vehicle door, the onboard device comprising:
   an occupant detector configured to detect an occupant inside a vehicle;
   a shut door determiner configured to determine whether the vehicle door is closed;
   an open door determiner configured to determine whether the vehicle door is open;
   a clocking portion configured to measure time after the open door determiner determines that the vehicle door is open and until the shut door determiner determines that the vehicle door is closed; and
   a locking controller configured, when the shut door determiner determines that the vehicle door is closed and the occupant detector detects the occupant, to lock the vehicle door when the time measured by the clocking portion is less than a predetermined time and to not lock the vehicle door when the time measured by the clocking portion is at least the predetermined time, wherein
   the locking controller is configured to lock the door in response to the occupant detector detecting the occupant inside the vehicle.

2. The onboard device according to claim 1, further comprising:
   a wireless communicator configured to perform wireless communication with a portable device; and
   a location determiner configured to determine whether the portable device is located inside the vehicle based on the wireless communication between the wireless communicator and the portable device,
   wherein the locking controller locks the vehicle door after the location determiner determines that the portable device is located inside the vehicle.

3. The onboard device according to claim 1, wherein the occupant detector detects sitting of the occupant on a seat corresponding to the vehicle door.

4. The onboard device according to claim 1, wherein the vehicle door is provided for getting on/off from a driver seat or a passenger seat.

5. The onboard device according to claim 1, wherein a plurality of vehicle doors are provided to the vehicle and the locking controller locks all the vehicle doors.

6. The onboard device according to claim 1, wherein the locking controller is configured to lock the door while vehicle is not in motion and the occupant detector detects the occupant.

* * * * *